United States Patent [19]

Yazu et al.

[11] Patent Number: 4,868,868
[45] Date of Patent: Sep. 19, 1989

[54] SUB-BAND SPEECH ANALYZING AND SYNTHESIZING DEVICE

[75] Inventors: Takashi Yazu; Makoto Morito, both of Tokyo, Japan

[73] Assignee: Oki Electric Industry Co., Ltd., Tokyo, Japan

[21] Appl. No.: 100,333

[22] Filed: Sep. 23, 1987

[30] Foreign Application Priority Data

Sep. 30, 1986 [JP] Japan ................................. 61-229807
Sep. 30, 1986 [JP] Japan ................................. 61-229808

[51] Int. Cl.$^4$ .............................................. G10L 7/02
[52] U.S. Cl. ......................................... 381/37; 381/36
[58] Field of Search ...................... 381/29, 31, 32, 36, 381/37, 41

[56] References Cited

U.S. PATENT DOCUMENTS 4,064,363 12/1977 Malm ................................... 381/37
4,086,431 4/1978 Franssen et al. ...................... 381/37

OTHER PUBLICATIONS

Crochiere et al., "Optimum FIR Digital Filter Implementations for Decimation, Interpolation, and Narrow-Band Filtering," IEEE Transactions on Acoustics, Speech, and Signal Processing, vol. ASSP-23, pp. 444–454, Oct. 1975.

Crochiere et al., "Further Considerations In The Design Of Decimators and Interpolators," IEEE Transactions on Acoustics, Speech and Signal Processing, vol. ASSP-24, No. 4, Aug. 1976, pp. 269–311.

The Bell System Technical Journal, vol. 55, No. 8, Oct. 1976, pp. 1069–1085, "Digital Coding of Speech in Sub-bands" R. E. Crochiere et al.

Primary Examiner—William M. Shoop, Jr.
Assistant Examiner—Marc S. Hoff
Attorney, Agent, or Firm—Spencer & Frank

[57] ABSTRACT

In a sub-band speech analyzing and synthesizing apparatus, a low-pass filter comprises a nonrecursive filter. The center frequency and bandwidth of each channel are selected so that the decimated sampling period of that channel is an integer multiple of the period of the modulating signal or the demodulating signal of the channel. Modulation or demodulation is performed simultaneously with the low-pass filtering by the nonrecursive filter.

7 Claims, 13 Drawing Sheets

ADDRESS (DECIMAL)

| Address | Contents |
|---|---|
| 0 – 79 | CHANNEL 1 COSINE COMPONENT FILTER COEFFICIENTS |
| 80 – 159 | CHANNEL 1 SINE COMPONENT FILTER COEFFICIENTS |
| 160 – 239 | CHANNEL 2 COSINE COMPONENT FILTER COEFFICIENTS |
| 240 – 319 | CHANNEL 2 SINE COMPONENT FILTER COEFFICIENTS |
| 320 – 399 | CHANNEL 3 COSINE COMPONENT FILTER COEFFICIENTS |
| 400 – 479 | CHANNEL 3 SINE COMPONENT FILTER COEFFICIENTS |
| 489 – 559 | CHANNEL 4 COSINE COMPONENT FILTER COEFFICIENTS |
| 560 – 639 | CHANNEL 4 SINE COMPONENT FILTER COEFFICIENTS |

ADDRESS

| Address | Contents |
|---|---|
| 0 | $h_0 \cos(2\pi(0/D)J)$ |
| 1 | $h_1 \cos(2\pi(1/D)J)$ |
| 2 | $h_2 \cos(2\pi(2/D)J)$ |
| ⋮ | ⋮ |
| 79 | $h_{79} \cos(2\pi(79/D)J)$ |
| 80 | $h_0 \sin(2\pi(0/D)J)$ |
| 81 | $h_1 \sin(2\pi(1/D)J)$ |
| 82 | $h_2 \sin(2\pi(2/D)J)$ |
| ⋮ | ⋮ |
| 159 | $h_{79} \sin(2\pi(79/D)J)$ |

FIG. 11A

| $1a_{10n'}$ | $1b_{10n'}$ | $2a_{10n'}$ | $2b_{10n'}$ | $3a_{10n'}$ | $3b_{10n'}$ | $4a_{10n'}$ | $4b_{10n'}$ | $1a_{10(n'+1)}$ | $1b_{10(n'+1)}$ | $2a_{10(n'+1)}$ | $2b_{10(n'+1)}$ |
|---|---|---|---|---|---|---|---|---|---|---|---|

FIG. 11B

| $1X_{10n'}$ | $2X_{10n'}$ | $3X_{10n'}$ | $4X_{10n'}$ | $5X_{10n'}$ | $6X_{10n'}$ | $7X_{10n'}$ | $8X_{10n'}$ | $1X_{10(n'+1)}$ | $2X_{10(n'+1)}$ | $3X_{10(n'+1)}$ | $4X_{10(n'+1)}$ |
|---|---|---|---|---|---|---|---|---|---|---|---|

FIG. 12

| ADDRESS (DECIMAL) | |
|---|---|
| 0 | $1 \times 10^{(n'-3)}$ |
| ⋮ | ⋮ |
| | $8 \times 10^{(n'-3)}$ |
| 8 | $1 \times 10^{(n'-2)}$ |
| ⋮ | ⋮ |
| | $8 \times 10^{(n'-2)}$ |
| 16 | $1 \times 10^{(n'-1)}$ |
| | $2 \times 10^{(n'-1)}$ |
| ⋮ | ⋮ |
| | $8 \times 10^{(n'-1)}$ |
| 24 → | $1 \times 10^{n'}$ |
| | $2 \times 10^{n'}$ |
| ⋮ | ⋮ |
| | $8 \times 10^{n'}$ |
| 32 | $1 \times 10^{(n'-7)}$ |
| | $2 \times 10^{(n'-7)}$ |
| ⋮ | ⋮ |
| | $8 \times 10^{(n'-7)}$ |
| 40 | $1 \times 10^{(n'-6)}$ |
| | $2 \times 10^{(n'-6)}$ |
| ⋮ | ⋮ |
| | $8 \times 10^{(n'-6)}$ |
| 48 | $1 \times 10^{(n'-5)}$ |
| ⋮ | ⋮ |
| | $8 \times 10^{(n'-5)}$ |
| 56 | $1 \times 10^{(n'-4)}$ |
| ⋮ | ⋮ |
| 63 | $1 \times 10^{(n'-4)}$ |

ADDRESS (DECIMAL)

| Address | j |
|---|---|
| 0 | j = 0 |
| 64 | j = 1 |
| 128 | j = 2 |
| 192 | j = 3 |
| 256 | j = 4 |
| 320 | j = 5 |
| 384 | j = 6 |
| 448 | j = 7 |
| 512 | j = 8 |
| 576 | j = 9 |
| 639 | |

ADDRESS (DECIMAL)   $iC'_{10(7-\ell)+j}$

| Address | Contents | j | $\ell$ | i |
|---|---|---|---|---|
| 0 | $_1C_{70}$ $_2C_{70}$ $_8C_{70}$ | j=0 j=0 j=0 | $\ell$=0 $\ell$=0 $\ell$=0 | i=1 i=2 i=8 |
| 8 | $_1C_{60}$ $_2C_{60}$ $_8C_{60}$ | j=0 j=0 j=0 | $\ell$=1 $\ell$=1 $\ell$=1 | i=1 i=2 i=8 |
| 16 | $_1C_{50}$ ⋮ $_8C_{50}$ | j=0 ⋮ j=0 | $\ell$=2 ⋮ $\ell$=2 | i=1 ⋮ i=8 |
| 24 | ⋮ | | | |
| 32 | ⋮ | | | |
| 40 | ⋮ | | | |
| 48 | ⋮ | | | |
| 56 | $_1C_0$ $_2C_0$ $_8C_0$ | j=0 j=0 j=0 | $\ell$=7 $\ell$=7 $\ell$=7 | i=1 i=2 i=8 |
| 64 | $_1C_{71}$ $_2C_{71}$ $_8C_{71}$ | j=1 j=1 j=1 | $\ell$=0 $\ell$=0 $\ell$=0 | i=1 i=2 i=8 |
| 72 | $_1C_{61}$ $_2C_{61}$ $_8C_{61}$ | j=1 j=1 j=1 | $\ell$=1 $\ell$=1 $\ell$=1 | i=1 i=2 i=8 |
| 80 | ⋮ | | | |
| 88 | ⋮ | | | |
| 96 | ⋮ | | | |
| 104 | ⋮ | | | |
| 112 | ⋮ | | | |
| 120 | $_1C_1$ $_2C_1$ $_8C_1$ | j=1 j=1 j=1 | $\ell$=7 $\ell$=7 $\ell$=7 | i=1 i=2 i=8 |
| 127 | | | | | ns # SUB-BAND SPEECH ANALYZING AND SYNTHESIZING DEVICE

BACKGROUND OF THE INVENTION

This invention relates to a speech processing device, more particularly to speech analysis and synthesis, used in sub-band speech analyzing and synthesizing apparatus.

The prior art of this technology is represented by the sub-band speech analyzing and synthesizing system described on pages 1069 to 1085 of *The Bell System Technical Journal*, 55[8] (1976-10), which will be referred to as the SBC (sub-band coding) system. As indicated in FIG. 1, the SBC system divides the speech signal into a number of frequency bands (usually four to eight) called channels, and codes and decodes the output of each channel separately. FIG. 2 shows the basic circuit configuration of the SBC system. The operation of this circuit is depicted in FIGS. 3A to 3E.

The operation of the SBC system will be explained next with reference to FIG. 2 and FIGS. 3A to 3E.

First, the analyzing device in the SBC system operates as follows.

An analog speech signal input from a microphone (not shown) is fed through a low-pass filter (not shown) which removes frequencies higher than half the rate at which the signal will be sampled, then to an A/D converter (not shown) which converts the analog signal to a digital signal S(n) by sampling it at this sampling rate. The letter n denotes the sample number. The digitized input signal S(n) is fed to a bandpass filter 201 which extracts a particular (k+h) band ($W_{1k}$ to $W_{2k}$). The output from this bandpass filter 201 is next cosine-modulated by multiplication in a multiplier 202 by a cosine wave having the frequency $W_{1k}$ indicated in FIG. 3B, and is thereby shifted into the baseband $(0-W_k)$ as shown in FIG. 3C. Unwanted frequency components above $2W_{1k}$ which arises at this point (for example, the components indicated by dashed lines in FIG. 3C) are removed by a low-pass filter 203. The resulting signal $r_k(n)$ requires only frequency components equal to or less than $W_k$, so necessary and sufficient information can be preserved by sampling it at a rate of $2W_k$. A decimator 204 therefore decimates (performs sampling rate reduction on) the unnecessarily high sampling rate to $2W_k$. The decimated signal is encoded by the coder 205 and the coded signal is sent to the synthesizing device.

To reconstruct the full-band signal, the synthesizing device performs exactly the reverse of the process performed by the analyzing device. Specifically, the coded signal is decoded by the decoder 206, then the interpolator 207 restores the decimated signal to its original sampling rate by interpolation. The signal output from the interpolator 207 is sent to a multiplier 208 and modulated by multiplication by a cosine wave with a frequency of $W_{1k}$, as shown in FIG. 3D. Then the signal is shifted from the baseband $(0-W_k)$ back to its original frequency band ($W_{1k}$ to $W_{2k}$) as in FIG. 3E, and components outside this band ($w_{1k}$ to $W_{2k}$) are removed by a bandpass filter 209.

The result is that the synthesizing device outputs the signal $\bar{S}_k(n)$.

The process described above is performed for each channel. Finally, the outputs in all channels are added to obtain the output signal.

Although the SBC system basically operates as described above, the circuit in FIG. 2 is not usually implemented directly. Instead, to reduce the amount of circuitry, a circuit configuration without bandpass filters, like that in FIG. 4 has been proposed for the SBC system.

The operation of the circuit in FIG. 4 will be explained next.

First the analysing device complex-modulates the digitized input signal S(n) by means of the complex signal $e^{j\omega_k n}$ (where $\omega_k=(W_{1k}+W_{2k})/2$). This complex modulation is accomplished by performing cosine modulation (using the modulating signal $\cos\omega_k n$) in a multiplier 301 and sine modulation (using the modulating signal $\sin\omega_k n$) in a multiplier 302. The outputs from the multipliers 301 and 302 are filtered by low-pass filters 303 and 304 with a bandwidth $0-W_{k/2}$.

The real part $a_k(n)$ of the complex signal $a_k(n)+jb_k(n)$ is output from the low-pass filter 303, and the imaginary part $b_k(n)$ output from the low-pass filter 304. The signals $a_k(n)$ and $b_k(n)$ are decimated to the frequency $W_k$ by decimators 305 and 306, respectively, then encoded by a coder 307 and sent to the synthesizing device.

In the synthesizing device, the encoded signals are decoded by a decoder 308, restored to their original sampling rates by the interpolators 309 and 310, filtered by low-pass filters 311 and 312 with a bandwidth $0-W_{k/2}$, then demodulated by a multiplier 313 which performs cosine modulation and a multiplier 314 which performs sine modulation. An adder 315 adds the resulting cosine and sine components to generate the signal for the particular channel.

The process described above is performed for each channel. Finally, the outputs in all channels are added to obtain the output signal.

Although smaller than the circuit shown in FIG. 1 due to the elimination of the first-stage bandpass filters, the circuit configuration of the prior art as shown in FIG. 4 is far from providing a practical speech processing device, because a low-pass filter is still required in each channel. Another drawback of the speech processing devices in the prior art is that two computational processes, one for modulation and one for filtering, are necessary, so if fixed-point arithmetic is used, the accumulation of computational errors in the two processes raises problems.

SUMMARY OF THE INVENTION

An object of the present invention is to provide a sub-band speech processing device that has a simple circuit configuration but is capable of high-quality analysis or synthesis.

According to one aspect of the invention, there is provided a sub-band speech analyzing device comprising: a low-pass filter that receives an input analog speech signal and removes from it frequency components greater than half the rate at which the signal will be sampled; an AD converter that samples the analog signal output from the low-pass filter at this sampling rate and converts it to a digital signal; and a nonrecursive filter that divides the digital input signal into multiple channels, amplitude-modulates the input signal in each channel by means of a cosine modulating signal and a sine modulating signal, these having frequencies equal to the center frequency of the channel, performs low-pass filtering of the amplitude-modulated components in each channel and decimates these components according to the bandwidth of the channel to extract the cosine and sine components in each channel; wherein the center frequency and bandwidth of each channel are selected so that the sampling period after decimation is an integer multiple of the period of the modulating signals.

The nonrecursive filter comprises: an input memory having at minimum a capacity adequate for the number of taps M of the nonrecursive filter, for storing the digital signals input from the A/D converter; a filter coefficient memory for storing two sets of precalculated new filter coefficients, one set consisting of the products $h_m\cos[2\pi(m/D)J]$ of a filter coefficient $h_m$ for low-pass filtering corresponding to the m-th tap, where m varies from 0 to M−1, and a cosine signal $\cos[2\pi(m/D)J]$ (where J is a positive integer constant that is preset for each channel, and D is the decimation factor $D=(f_S/f_k)J$, with $f_S$ being the sampling frequency used in low-pass filtering in the nonrecursive filter and $f_k$ the center frequency of the channel) and the other set consisting of the products $h_m\sin[2\pi(m/D)J]$ of the filter coefficient $h_m$ and the sine signal $\sin[2\pi(m/D)J]$, the number of these new filter coefficients being the number required by the number of taps M and the number of channels; and a multiplier-accumulator circuit for performing multiply-add operations to extract the cosine and sine components in each channel at the decimated sampling rate, using the digital input signals stored in the input memory and the new filter coefficients stored in the filter coefficient memory.

According to another aspect of the invention, there is provided a sub-band speech synthesizing device for receiving from a sub-band speech analyzing device cosine component data and sine component data for each of a number of channels at a decimated sampling rate, interpolating the cosine component data and sine component data, and performing low-pass filtering and demodulation on the cosine component data and the sine component data to reconstruct the full-band signal, wherein: the data received are generated by sampling a signal at a given sampling rate, performing amplitude modulation on the resulting digital input signal by means of a cosine wave and a sine wave having a frequency equal to the center frequency of that channel, filtering the resulting modulated components by a low-pass filter, and decimating the signals in each channel by a factor depending on the bandwidth of the channel, so that the decimated sampling period is an integer multiple of the period of the modulating signal. The interpolation, low-pass filtering, and demodulation are performed by a nonrecursive filter.

The nonrecursive filter of the sub-band speech synthesizing device comprises:

an input memory for storing at least as much cosine and sine component data received from the analyzing device at the decimated sampling rate as required for the low-pass filtering computation;

a coefficient memory in which are prestored a set of first filter coefficients, these being the products of the filter coefficients necessary for low-pass filtering multiplied by the demodulating cosine wave, and a set of second filter coefficients, these being the products of the above filter coefficients necessary for low-pass filtering and the demodulating sine wave, with the number of such coefficients depending on the number of taps of the nonrecursive filter and being adequate for the calculation of the data at each sample point after interpolation;

a multiplier-accumulator circuit for multiplying the cosine component data by the first set of filter coefficients and the sine component data by the second set of filter coefficients, and accumulating the results for all channels to generate the synthesized output; and a control section for calculating the synthesized outputs at each sample point after interpolation in succession, using the data stored in the input memory, the first and second sets of filter coefficients stored in the coefficient memory, and the multiplier-accumulator circuit described above.

The low-pass filter of the speech analyzing or synthesizing device of the present invention, shown in FIG. 4, has the configuration of a nonrecursive filter (that is, a finite impulse response filter; the abbreviation FIR filter will be used below). The center frequency and bandwidth of each channel are selected so that the decimated sampling period of that channel is an integer multiple of the period of the modulating signal or the demodulating signal of that channel. Modulation or demodulation is performed simultaneously with the low-pass filtering by the FIR filter.

BRIEF DESCRIPTION OF THE DRAWINGS

FIG. 9A is a map of the filter coefficient memory.

FIG. 9B is an enlargement of part of FIG. 9A.

FIG. 11A and FIG. 11B show the input data format.

FIG. 12 is a map of the input memory 21.

FIG. 13A is a map of the coefficient memory 22.

FIG. 13B is an enlargement of part of FIG. 13A.

DETAILED DESCRIPTION OF THE PREFERRED EMBODIMENT

First a sub-band speech analyzing device according to the invention is described.

Figure 1:
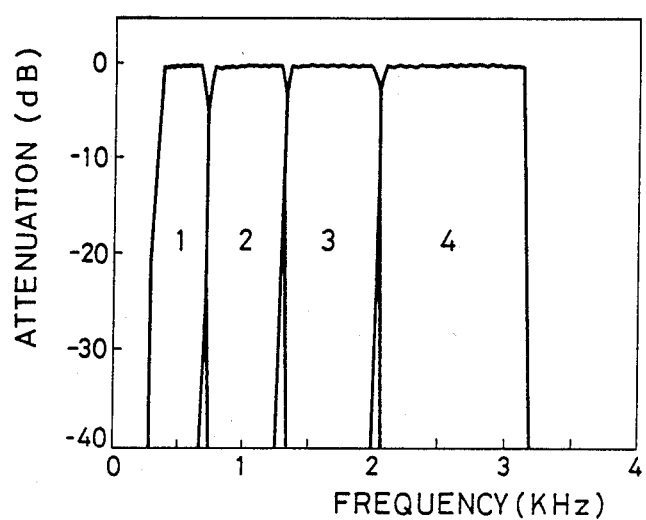
FIG. 1 shows an example of band partitioning in the SBC system.
Figure 2:
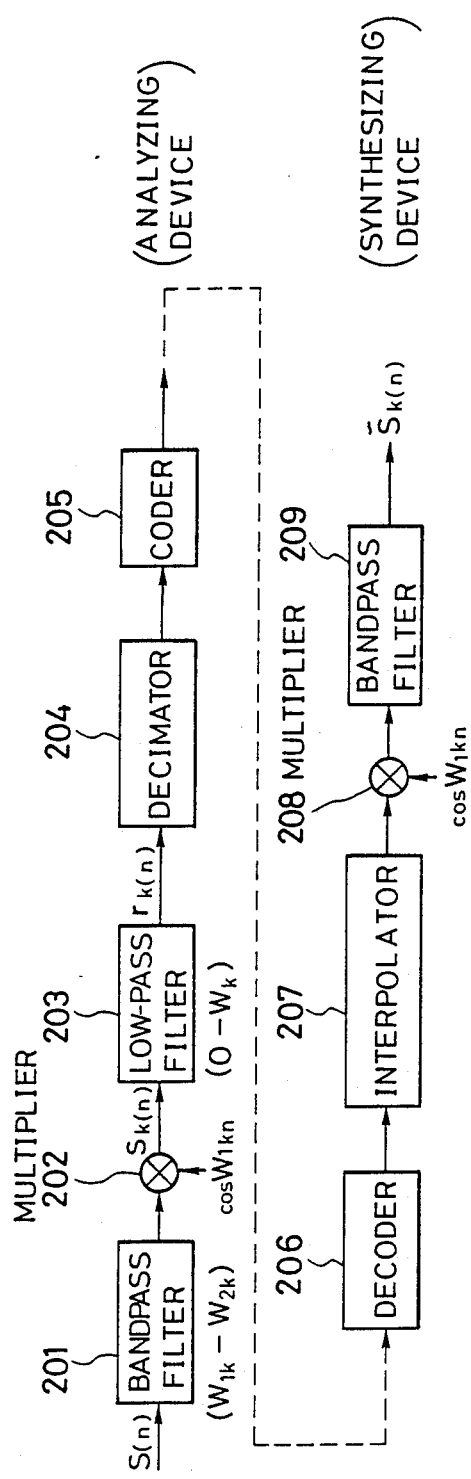
FIG. 2 is a block diagram of the prior art of speech analyzing and synthesizing device using the SBC system.
Figure 3A:
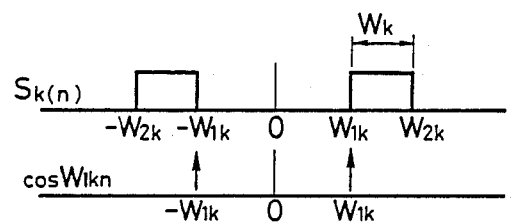
FIG. 3A to FIG. 3E show the operation of the speech analyzing and synthesizing device of FIG. 2.
Figure 3B:
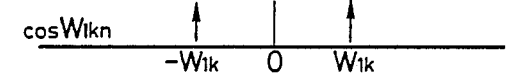
Figure 3C:
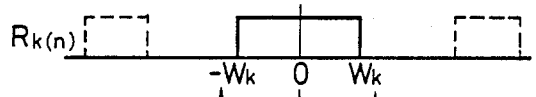
Figure 3D:
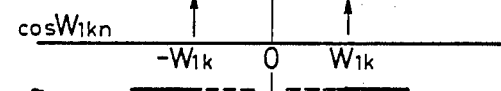
Figure 3E:
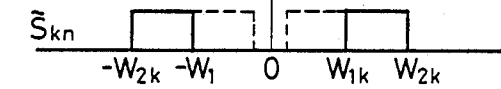
Figure 4:
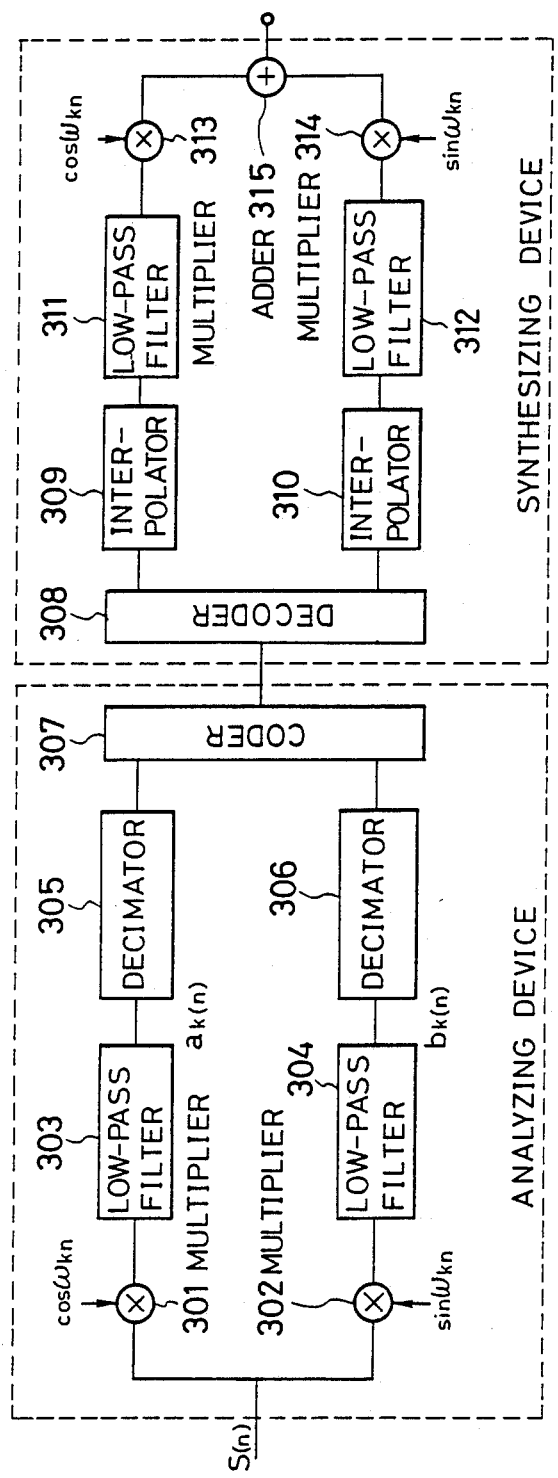
FIG. 4 is a block diagram of another implementation of the prior art of speech analyzing and synthesizing device using the SBC system.
Figure 5:
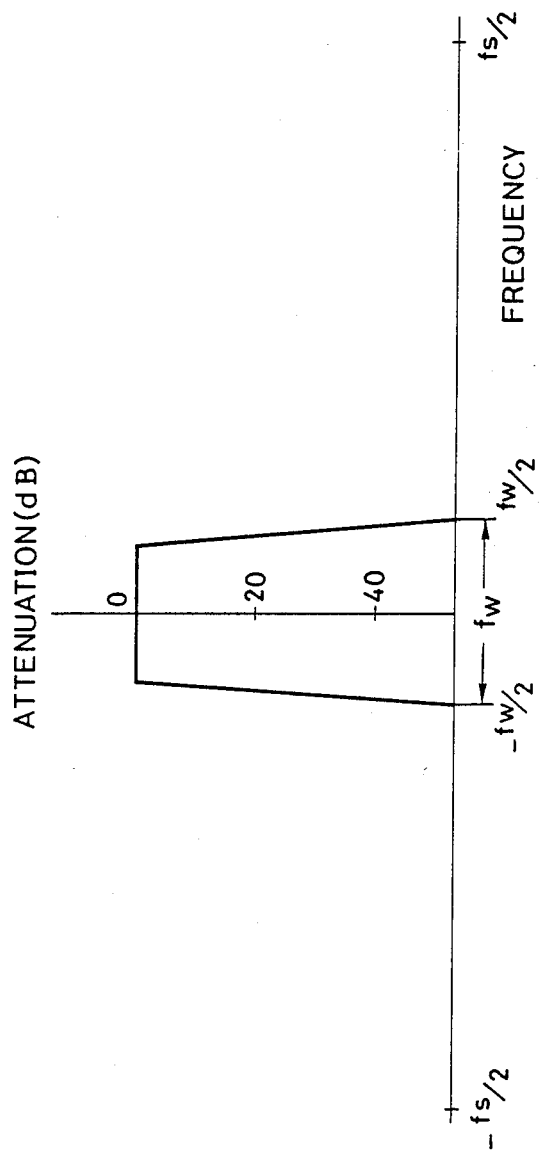
FIG. 5 shows the frequency-amplitude characteristic of a low-pass filter.

First the relationship between the low-pass filter (an FIR filter in this invention) and decimation will be explained. FIG. 5 shows the frequency-amplitude characteristic of the low-pass filter, with frequency on the horizontal axis and attenuation on the vertical axis. $f_s$ is the sampling rate of the input signal of the low-pass filter, and $f_W$ is the bandwidth of a given channel. Due to the frequency-amplitude characteristic shown in FIG. 5, the output signal of the low-pass filter does not include any frequency components above $f_W/2$.

The Nyquist sampling theorem therefore implies that necessary and sufficient information is preserved when the output signal from the low-pass filter is resampled at a decimated sampling rate $f_D$, where $f_D \geq f_W$.

To simplify processing, the decimated sampling rate $f_D$ is normally chosen to be $1/D$ of the original signal sampling rate $f_S$, where D is a positive integer. If $f_S=10$ kHz and $f_W=1$ kHz, for example, the low-pass filter output, which is calculated at a rate of $f_S$, can be decimated by taking one sample in every 10. In this invention such decimation is carried out in the FIR filter.

Figure 6:
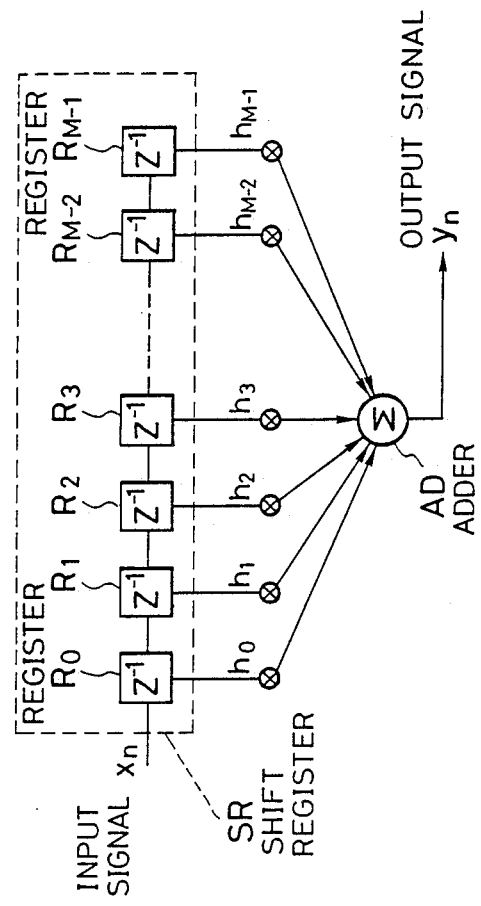
FIG. 6 shows the basic structure of an FIR filter.

FIG. 6 shows the basic configuration of an FIR filter with M taps. AD is an adder and $R_0, R_1, R_2, \ldots, R_{M-1}$ are registers which together form a shift register SR. The output signal y(n) of this FIR filter is related to the input signal x(n) by Eq. (1):

$$y_n = \sum_{m=0}^{M-1} h_m x_{n-m} \tag{1}$$

The coefficients $h_m$ of the FIR filter are determined by the desired impulse response of the low-pass filter. Since the output of the FIR filter is calculated without using the past outputs of the filter, if the output will be decimated by a factor of D, it is necessary to calculate the output only once every D times; nothing is gained by calculating the intervening values.

In addition to decimation and low-pass filtering as explained above, the FIR filter in this invention performs cosine and sine modulation. This will be explained next.

For cosine modulation, the output $Y_n$ of the FIR filter is given by Eq. (2):

$$y_n = \sum_{m=0}^{M-1} h_m x_{n-m} \cos\omega_k(n-m)T_S \tag{2}$$

where $\omega_k$ is the center frequency of the channel and $T_S$ is the sampling period of the input signal $x_n$. As explained above, the low-pass filter computation is carried out at the decimated sampling rate, so by defining $n=Dn'$ we can rewrite Eq. (2) as follows:

$$y_{Dn'} = \sum_{m=0}^{M-1} h_m x_{Dn'-m} \cos\omega_k(Dn'-m)T_S \tag{3}$$

If the decimation factor D and the center frequency $f_k$ are selected so that:

$$\frac{f_s}{f_k} \cdot J = D \tag{4}$$

(where J is a positive integer) then Eq. (3) can be rewritten as Eq. (5):

$$y_{Dn'} = \sum_{m=0}^{M-1} h_m x_{Dn'-m} \cos 2\pi \frac{m}{D} J \tag{5}$$

From Eq. (5) it is clear that the cosine coefficients are the same for each sample, being independent of n'. If we define:

$$c_m = h_m \cos 2\pi \frac{m}{D} J \tag{6}$$

we can rewrite Eq. (5) as follows:

$$y_{Dn'} = \sum_{m=0}^{M-1} c_m \cdot x_{Dn'-m} \tag{7}$$

The low-pass filter coefficients $c_m$ can be stored in a read-only memory, thereby making separate cosine multiplication unnecessary and leaving only a single series of operations to be performed on the $x_{Dn'-m}$. In the same way the sine multiplications can be eliminated from the sine modulation, so that modulation (cosine modulation and sine modulation), low-pass filtering, and decimation can all be accomplished together by the low-pass filter computation in the FIR filter.

Table 1 is an example of the possible center frequencies and bandwidths for the channels in an FIR filter in a speech analyzing device according to this invention when the sampling frequency of the input signal is $f_S=8$ kHz.

TABLE 1

| No. | DECIMATION FACTOR D | BANDWIDTH ($f_w$) | CENTER FREQUENCY OF EACH CHANNEL $f_k$ (Hz) | | | | | | | |
|---|---|---|---|---|---|---|---|---|---|---|
| | | | J = 1 | J = 2 | J = 3 | J = 4 | J = 5 | J = 6 | J = 7 | J = 8 |
| 1 | 20 | (400) | 400 | 800 | 1200 | 1600 | 2000 | 2400 | 2800 | 3200 |
| 2 | 19 | (421) | 421 | 842 | 1263 | 1684 | 2105 | 2526 | 2947 | 3368 |
| 3 | 18 | (444) | 444 | 889 | 1333 | 1778 | 2222 | 2667 | 3111 | 3556 |
| 4 | 17 | (470) | 470 | 941 | 1412 | 1882 | 2353 | 2824 | 3294 | |
| 5 | 16 | (500) | 500 | 1000 | 1500 | 2000 | 2500 | 3000 | 3500 | |
| 6 | 15 | (533) | 533 | 1067 | 1600 | 2133 | 2667 | 3200 | | |
| 7 | 14 | (571) | 571 | 1143 | 1714 | 2286 | 2857 | 3429 | | |
| 8 | 13 | (615) | 615 | 1230 | 1846 | 2462 | 3077 | | | |
| 9 | 12 | (667) | 667 | 1333 | 2000 | 2667 | 3333 | | | |
| 10 | 11 | (727) | 727 | 1455 | 2182 | 2910 | | | | |
| 11 | 10 | (800) | 800 | 1600 | 2400 | 3200 | | | | |
| 12 | 9 | (889) | 889 | 1778 | 2667 | | | | | |
| 13 | 8 | (1000) | 1000 | 2000 | 3000 | | | | | |

The decimation factor D can be any positive number, so the values in Table 1 can vary if different values of D are used.

Table 1 or a table constructed in a similar way provides a set of band-partitioning parameters, from which the desired parameters can be selected for the FIR filter of this invention.

Figure 7:
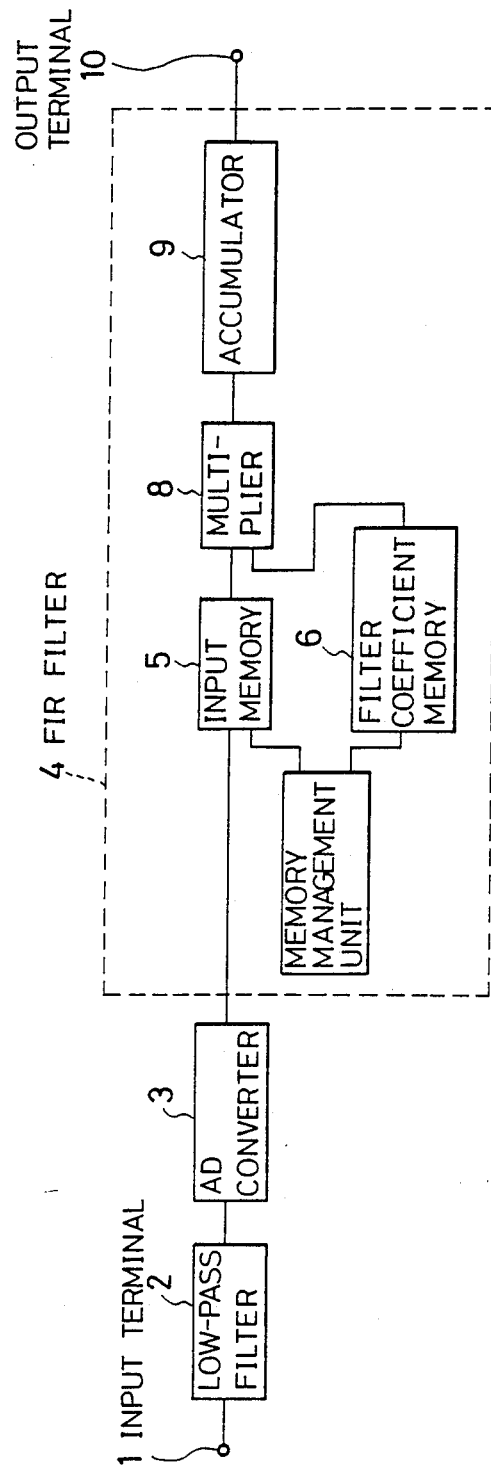
FIG. 7 is a block diagram of an embodiment of the present invention.

FIG. 7 is a block diagram of a sub-band speech analyzing device embodying this invention, which comprises an analog signal input terminal 1, a low-pass filter 2, an A/D converter 3, and an FIR filter 4.

The FIR filter 4 in this embodiment comprises an input memory 5 for storing the digital signals sent from the A/D converter 3, a coefficient memory 6 for storing the filter coefficients indicated previously in Eq. (6), a memory management unit 7 for addressing and read/write control of the input memory 5 and the coefficient memory 6, a multiplier 8 for multiplying the digital signals from the input memory 5 from the filter coefficients from the coefficient memory 6, an accumulator 9 for accumulating the products from the multiplier 8 for each channel, and an output terminal 10.

In this embodiment the input signal is sampled at 8 kHz and divided into four channels having the following center frequencies, bandwidths, and constants J:

|           | Center frequency | Bandwidth | J |
|-----------|------------------|-----------|---|
| Channel 1 | 800 Hz           | 800 Hz    | 1 |
| Channel 2 | 1600 Hz          | 800 Hz    | 2 |
| Channel 3 | 2400 Hz          | 800 Hz    | 3 |
| Channel 4 | 3200 Hz          | 800 Hz    | 4 |

The number of taps of the filter is M=80.

Figure 8:
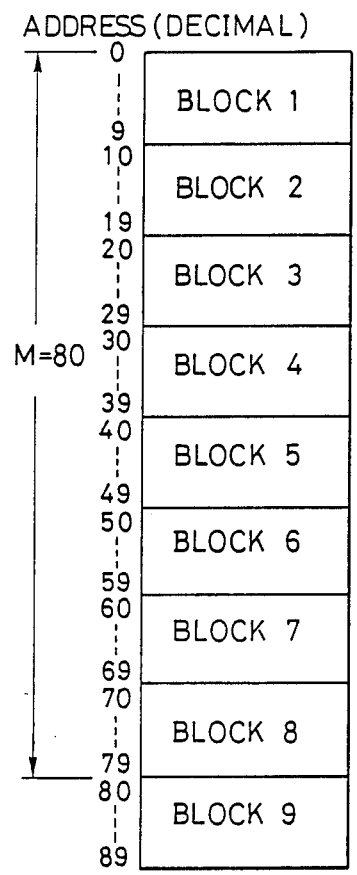
FIG. 8 is an input memory map.

The configuration of the input memory 5 will be described with reference to FIG. 8. This input memory 5 requires at minimum enough capacity to hold the latest data for the number of filter taps (80) during the filter computation performed in the FIR filter 4, but to enable it to buffer the ten data input during the decimation period, since new data continue to arrive at a rate of 8 kHz while the filter computations are being performed, the input memory 5 has capacity for ten additional data. The total memory capacity has therefore 90 words.

Next the configuration of the coefficient memory 6 will be described with reference to FIG. 9A and 9B. FIG. 9A is a map of the entire coefficient memory 6, while FIG. 9B is an enlargement of part of this map. For each channel, the coefficient memory 6 stores the 80 filter coefficients $h_m \cos[2\pi(m/D)J]$ given for cosine modulation in Eq. 6 and the 80 filter coefficients $h_m \cos[2\pi(m/D)J]$ for sine modulation (where m=0 to 79), 80 being the number of taps of the filter.

Next the operation of this embodiment of the invention will be explained with reference to FIGS. 7, 8, 9A, and 9B.

First an analog signal from a microphone or other device (not shown) is input from the analog signal input terminal 1. This analog input signal is fed to the low-pass filter 2 which removes the frequency components higher than half the sampling rate, then to the A/D converter 3 which converts the analog signal to a series of digital input data signals S(n) at the given sampling rate (8 kHz in this embodiment).

These input data signals S(n) are fed to the FIR filter 4 and stored in the input memory 5 under control of the memory management unit 7, starting at address 0. The addresses in the input memory 5 wrap around from 89 to 0, so after data have been written in all addresses up to 89, the next data value is written in address 0 again. The memory management unit 7 reads and writes the input memory 5 and reads filter coefficients from the coefficient memory 6 in parallel by means of time-division among the four channels, so while input data are being written in the input memory 5, previous input data already stored in the input memory 5 and filter coefficients stored in the coefficient memory 6 are being continually read out, multiplied, and accumulated according to Eq. (7) by means of the multiplier 8 and accumulator 9. Within a single decimated sampling period, this multiply-accumulate computation generates the cosine component $a_n$ and the sine component $b_n$ for each channel. The same computation is repeated in every decimated sampling period. A more detailed description of this computation follows.

Assume that writing of the input data S(n) has been completed through block 8 of the input memory. At the completion of the writing of this block the accumulator 9 is reset. Next the memory management unit 7 sets the read address of the input memory 5 to the leading address of block 1 and the read address of the coefficient memory 6 to the leading address of that memory. After these settings, input data are read from the input memory 5 and cosine filter coefficients are read from the coefficient memory 6, and these pairs of values are multiplied and added to the sum in the accumulator. This operation is repeated 80 times, 80 being the number of taps of the filter, with the read addresses in the input memory 5 and the coefficient memory 6 incremented as each pair of values is read. This completes the computation of the cosine component $a_n$ for channel 1; the result stored in the accumulator 9 is sent to the output terminal 10 and then the accumulator 9 is reset. Next the read address of the input memory 5 is reset to the leading address of block 1.

The read address of the coefficient memory 6 continues to increment, however, and is now set at the leading address of the filter coefficients for the sine component of channel 1. The same multiply-add sequence is performed again, resulting in the sine component $b_n$ for channel 1, which is sent to the output terminal 10.

The operation continues by computing the cosine components $a_n$ and sine components $b_n$ for channels 2 through 4 in the same way and sending them to the output terminal 10.

During this operation input data are being written into block 9 of the input memory 5 under time-division, and at the end of the decimated sampling period block 9 is completely filled with new input data. In the next decimated sampling period new input data are written into block 1 of the input memory 5, while the input data stored in blocks 2 through 9 are used to calculate and output a new set of cosine and sine components. This cycle is repeated in subsequent decimated sampling periods as well: while new input data are stored in the input memory 5, the input data stored previously are multiplied and added to generate cosine and sine components, which are output. Block 1 through 9 of the input memory 5 are used cyclically.

By means of this multiply-add computation that calculates the cosine and sine components, in each decimated sampling period and for each channel, the FIR filter simultaneously carries out low-pass filtering and cosine or sine modulation.

Because this invention uses a new set of filter coefficients that, as described above, incorporate the products of the modulating waveform (cosine modulation or sine modulation) and the low-pass filter coefficients, the sub-band speech analyzing device of this invention does not require the first-stage modulation multiplications and low-pass filtering to be performed separately, as in the prior art, so both the amount of computation and the computational error are reduced, and since the modulating waveform and the low-pass filter coefficients are combined as products in the new filter coefficients, the memory space for storing them is greatly reduced as compared with the prior art.

In addition, the input signal to the FIR filter that functions as the low-pass filter in the analyzing device in this invention is not a signal obtained by modulating the input signal, as in the prior art, but the actual output from the A/D converter, so whereas the prior art required an input memory equivalent to {(the number of channels)×2×(the number of filter taps)}, the input memory capacity in the present invention need only be equivalent to {the number of taps (example: 80) plus a buffer capacity (example: 10 values)}. Circuit size can therefore be greatly reduced.

This invention can be used in sub-band speech analyzing and synthesizing equipment, by which is meant speech analyzing and synthesizing equipment employing the SBC system, or in a channel vocoder or other device, but its utility is not limited to speech processing equipment: it can also be used in short-interval spectrum analysis equipment.

Figure 10:
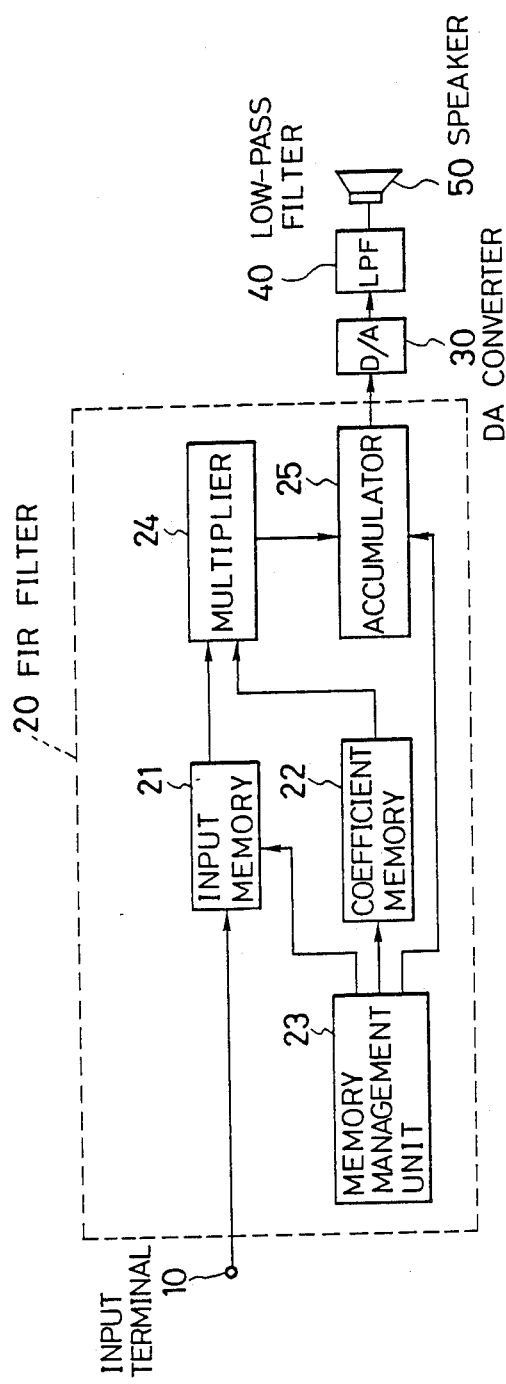
FIG. 10 is a block diagram of an embodiment of this invention.

Next a speech synthesizing device according to this invention will be described. The data sent from the analyzing device to the synthesizing device comprise cosine component data and sine component data and have been decimated in each channel by a factor depending on the bandwidth of the channel ($f_{Dz}f_W$). The synthesizing device must restore these data to the original sampling rate. That is, it must perform interpolation to generate the data that were removed within the decimation period. This interpolation is performed in effect by inserting zero values at the points where data were lost by decimation, then removing the unwanted high-frequency components that result from these insertions by low-pass filtering. In this invention an FIR filter is used for this low-pass filtering. The overall configuration of the FIR filter used as shown in FIG. 10.

In this invention low-pass filtering is carried out together with the demodulation of the cosine and sine components by a cosine wave and sine wave in the FIR filter. Using the same symbols $x_n$, $y_n$, $h_m$ and M as with the analyzing device to represent respectively the input signal, the output signal, the FIR coefficients and the number of taps of the FIR filter of the synthesizer device, the result of demodulation of the cosine component is expressed by multiplying the result of Eq. (1) by the cosine wave. This result is renamed $y_n'$ in Eq. (8) below.

$$y_n' = \cos[\omega_k nT_S] \sum_{m=0}^{M-1} h_m x_{n-m} \quad (8)$$

In this equation $\omega_k$ is the center frequency of the channel and $T_S$ is the sampling period after interpolation. Since zeros are interpolated for $x_n$ at points between the decimated sample points, the computation in Eq. (8) can be skipped at these points where $x_n = 0$. If the sample points at the decimated sampling rate are represented by $n = Dn'$, then Eq. (8) can be rewritten as Eq. (9) below:

$$y_{Dn'+j} = \cos[\omega_k(Dn' + j)T_S] \sum_{l=0}^{\left[\frac{M-j-1}{D}\right]} h_{Dl+j} \cdot x_{D(n'-l)} \quad (9)$$

where $j = 0, 1, 2, \ldots, (D-1)$ and the brackets in the $[(M-j-1)/D]$ notation indicate the greatest integer not exceeding the enclosed value.

The decimation factor D is given by the following formula:

$$(f_S/f_k) J = D \quad (10)$$

where $f_k$ is the center frequency of the channel, $f_S$ is the sampling rate after interpolation, and J is an arbitrary nonnegative constant set for each channel.

Eq. (10) can be used to rewrite Eq. (9) as Eq. (11) below:

$$y_{Dn'+j} = \cos\left[2\pi \frac{j}{D} J\right] \sum_{l=0}^{\left[\frac{M-j-1}{D}\right]} h_{Dl+j} \cdot x_{D(n'-l)} \quad (11)$$

As is clear from Eq. (11), the coefficient $$\cos[2\pi(j/D)J]$$

is independent of n', so a new filter constant $C_{Dl+j}$ can be defined by multiplying the cosine coefficient by the original filter coefficient h as follows:

$$y_{Dn'+j} = \sum_{l=0}^{\left[\frac{M-j-1}{D}\right]} c_{Dl+j} \cdot x_{D(n'-l)} \quad (12)$$

These constants are stored in memory and the following computation is performed:

$$y_{Dn'+j} = \sum_{l=0}^{\left[\frac{M-j-1}{D}\right]} c_{Dl+j} \cdot x_{D(n'-l)} \quad (13)$$

Low-pass filtering and cosine demodulation are thus accomplished simultaneously.

Demodulation of the sine components multiplied by the sine wave is handled in the same way. The mathematical description can be obtained by substituting sin for cos in Eqs. (8), (9), (11), (12), and (13) above.

The FIR filter in this invention can thus perform interpolation, low-pass filtering, and demodulation of the cosine and sine components all in one operation.

An example of the possible center frequencies and bandwidths for the channels in an FIR filter in a speech synthesizing device of this invention when the input signal has a sampling rate of $f_S = 8$ kHz is also as shown in the Table 1.

As pointed out in the description of the analyzing device, the decimation factor D can be any positive number, so the values in Table 1 can vary if different values of D are used.

Table 1 or a table constructed in a similar way provides a set of band-partitioning parameters, from which the desired parameters can be selected for the FIR filter of this invention.

FIG. 10 is a block diagram of a sub-band speech synthesizing device embodying this invention, which comprises an input terminal 11 for receiving encoded data from a speech analyzing device (which is not shown in FIG. 10 but can be one shown in FIG. 7), an FIR filter 20, a D/A converter 30, a low-pass filter 40, and a speaker 50.

The FIR filter 20 in this embodiment comprises an input memory 21 for storing the encoded data, a coefficient memory 22 for storing the filter coefficients $C_{Dl+j}$ indicated previously in Eq. (12), a memory management unit 23 for addressing and read/write control of the input memory 21 and the coefficient memory 22 and for control of the accumulator 25 described below, a multiplier 24 for multiplying the encoded data from the input memory 21 by the filter coefficients from the coefficient memory 22, and an accumulator 25 for accumulating the products from the multiplier 24 for each component in each channel.

It is assumed that in the analyzing device, the input signal is sampled at 8kHz and divided into four channels having the following center frequencies, bandwidths, (decimation factors), and constants J:

|  | Center frequency | Bandwidth | (Decimation factor) | J |
|---|---|---|---|---|
| Channel 1 | 800 Hz | 800 Hz | (10) | 1 |
| Channel 2 | 1600 Hz | 800 Hz | (10) | 2 |
| Channel 3 | 2400 Hz | 800 Hz | (10) | 3 |
| Channel 4 | 3200 Hz | 800 Hz | (10) | 4 |

The same parameters are accordingly used for the synthesizing device in this embodiment.

The number of taps of the FIR filter is M=80.

Next the operation of this embodiment will be described. The following is an additional explanation of the foregoing Eq. (13), the input data format, and the configurations of the input memory 21 and the coefficient memory 22.

Let the data received from the analyzing device at the decimated sampling rate be represented by $X_{Dn'}$ as indicated in Eq. (13).

Eq. (13) is reproduced below as Eq. (14).

$$y_{Dn'+j} = \sum_{l=0}^{\left[\frac{M-j-1}{D}\right]} c_{Dl+j} \cdot x_{D(n'-l)} \tag{14}$$

where the brackets [ ] indicate the greatest integer not exceeding the enclosed value.

Eq. (14) describes only the computation performed for the cosine or sine component in one channel, but the final output of the actual synthesizing operation is the total of all the cosine and sine components. Let $_ia_{Dn'}$ be the input data for the cosine component and $_ib_{Dn'}$ be the input data for the sine component in the i-th channel. If all channels have the same number of filter taps M and the same bandwidth, hence the same decimation factor D, the final output $Y_{Dn'+j}$ is given by Eq. (15).

$$y_{Dn'+j} = \sum_{i=1}^{ICH} \sum_{l=0}^{\left[\frac{M-j-1}{D}\right]} (_ic^{cos}_{Dl+j} \cdot {}_ia_{D(n'-l)} + {}_ic^{sin}_{Dl+j} \cdot {}_ib_{D(n'-l)}) \tag{15}$$

Where ICH is the number of channels, $_iC^{cos}_{Dl+j}$ is the filter coefficient of the cosine component $_ia_{D(n'-l)}$, and $_iC^{sin}_{Dl+j}$ is the filter coefficient of the sine component $_ib_{D(n'-l)}$.

If the actual numbers for this embodiment are substituted into Eq. (15), the result is Eq. (16) below.

$$Y_{10n'+j} = \sum_{i=1}^{4} \sum_{l=0}^{7} (_ic^{cos}_{10l+j} \cdot {}_ia_{D(n'-l)} + {}_ic^{sin}_{10l+j} \cdot {}_ib_{D(n'-l)}) \tag{16}$$

where j=0 to 9.

The input data sent from the analyzing device have the following format. As shown in FIG. 11A, at the (post-decimation) sample point 10n' the analyzing device sends the cosine component $_ia_{10n'}$ and sine component $_ib_{10n'}$ for each channel i in sequence, so the data arrive in the order $_1a_{10n'}$, $_1b_{10n'}$, $_2a_{10n'}$, ..., $_4b_{10'}$, $_1a_{10(n'+1)}$, $_1b_{10(n'+1)}$, .... The input data format shown in FIG. 11A can be regarded as the data format shown in FIG. 11B. At the decimated-rate sample point 10n', accordingly, we regard $_1a_{10n'}$ as $_1x_{10n'}$, $_1b_{10n'}$ as $_2x_{10n'}$, $_2a_{10n'}$ as $_3x_{10n'}$, $_2b_{10'}$ as $_4x_{10n'}$, $_3a_{10n'}$ as $_5x_{10n'}$, $_3b_{10n'}$ as $_6x_{10n'}$, $_4a_{10n'}$ as $_7x_{10n'}$, and $_4b_{10n'}$ as $_8x_{10n'}$. The same renaming is done at the other sample points of the decimated sampling rate.

With this notation Eq. (16) above is rewritten as Eq. (17):

$$Y_{10n'+j} = \sum_{i=1}^{8} \sum_{l=0}^{7} {}_ic'_{10l+j} \cdot {}_ix_{10(n'-l)} \tag{17}$$

The filter coefficient $_iC'_{10l+j}$ is the coefficient for the cosine component when i is odd and for the sine component when i is even.

The FIR filter 20 in this embodiment performs the computation corresponding to Eq. (17).

Next the structure of the input memory 21 will be explained with reference to FIG. 12. As will be understood from Eq. (16) or Eq. (17) above, the input memory 21 must store data for 4 channels ×2 (cosine and sine) components × 8 sample points (including the current point at the decimated sampling rate), so a total capacity of 64 words is required. The input data are written in the input memory 21 sequentially in the order in which read, starting at address 0. When all 64 words have been used the address wraps around and writing starts from address 0 again. FIG. 12 shows the state in which the current latest input data have been written in the 8 words starting at address 24.

Next the structure of the coefficient memory will be described with reference to FIG. 13A and FIG. 13B. Before this description it must be explained that in this embodiment, to simplify memory control, the computation in Eq. (17) above is performed as shown in Eq. (18).

$$Y_{10n'+j} = \sum_{l=0}^{7} \sum_{i=1}^{8} {}_ic'_{10(7-l)+j} \cdot {}_ix_{10(n'-7+l)} \tag{18}$$

The j=0 block of the coefficient memory 22 contains the filter coefficients $_iC'_{10(7-l)+j}$ (where i varies from 1 to 8, l varies from 0 to 7, and j=0) for calculating the synthesized output $Y_{10n'+j}$ (where j=0) from the input data for the sample point $10_{n'}$ by means of Eq. (18). The j=1 block contains the filter coefficients $_iC'_{10(7-l)+j}$ (where i varies from 1 to 8, l varies from 0 to 7, and j=1) for calculating the synthesized output $Y_{10n'+j}$ (where j=1) from the input date for the sample point after the following interpolation by means of Eq. (18). Similarly, the blocks j=2 through 9 contain the filter coefficients $_iC'_{10(7-l)+j}$ (where i varies from 1 to 8, l varies from 0 to 7, and j varies from 2 to 8) for calculating, by means of Eq. (18), the synthesized output $Y_{10n'+j}$ (where j=2 to 9) from the input data for the other sample points after interpolation. FIG. 13B is an enlarged depiction of part of FIG. 13A.

This memory configuration enables the computation to be performed by means of sequential access to the coefficient memory 22.

The operation of this embodiment will now be explained in detail with reference to FIG. 10, FIG. 11A, FIG. 11B, FIG. 12, FIG. 13A, and FIG. 13B.

First the input data $_1x_{10n'}$ to $_8x_{10n'}$ are received from the analyzing device via the output terminal 10 and stored in the input memory 21. Assume that these input data are written starting from address 24 of the input memory 21 as shown in FIG. 8. That is, at the start of the operation the memory management unit 23 addresses the input memory 21 at address 24, and the memory management unit 23 increments this address by 1 as each input data value from $_1x_{10n'}$ to $_8x_{10n'}$ is written in the input memory 21. After the completion of the writing of the input data $_8x_{10n'}$, accordingly, the memory management unit 23 addresses the input memory 21 at address 32, which is the location of the oldest data ($_1x_{n-7}$) stored in the input memory 21.

At this point the memory management unit 23 addresses the coefficient memory 22 at address 0, the leading address of the j=0 block, and the accumulator 25 is reset to 0. Next the data from the addresses in the input memory 21 and the coefficient memory 22 set as described above are read and multiplied in the multiplier 24, and the result is added to the accumulator 25. This operation is repeated 64 times, with the addresses in the input memory 21 and the coefficient memory 22 incremented each time. When the address in the input memory 21 reaches 63 during this process, it wraps around to address 0 and incrementing continues. These 64 multiply-accumulate operations complete the computation described by Eq. (18). The result $Y_{10n'}$ is sent to the D/A converter 30, which converts the incoming digital signal to an analog signal which is fed through the low-pass filter 40 to the speaker 50 and output as the synthesized sound.

When the memory management unit 23 again addresses the input memory 21 at address 32 it also addresses the coefficient memory 22 at the leading address 64 of the j=1 block and resets the accumulator 25. The computation in Eq. (18) is now performed again by another 64 repetitions of the cycle described above to obtain the result $Y_{10n'+1}$ which is output through the D/A converter 30, the low-pass filter 40, and the speaker 50 as the synthesized sound.

This process continues in the same way, using the input data stored in the input memory 21 and the data (filter coefficients) stored in the blocks for j=2 through 9 of the coefficient memory 22 to calculate $Y_{10n'+2}$ through $Y_{10n'+9}$ in succession, and these results are output through the D/A converter 30, the low-pass filter 40, and the speaker 50 as the synthesized sound. Then new input data $_1x_{10(n'+1)}$ to $_8x_{10(n'+1)}$ are input via the input terminal and stored in the input memory 21, and since at the conclusion of the computation of $Y_{10n'+9}$ as described above the memory management unit 23 addresses the input memory 21 at address 32, it is not necessary to change this address. The new data $_1x_{10(n'+1)}$ to $_8x_{10(n'+1)}$ are stored in addresses 32 through 39 of the input memory 21.

By continuing to repeat the computation given in Eq. (18) and the storing of input data in the input memory 21, the speech synthesizing device of this embodiment demodulates the input data and reconstructs the original signal.

To simplify the above description, addresses have been given in decimal notation.

Because the sub-band speech synthesizing device of this invention uses an FIR filter with a new set of filter coefficients that, as described above, incorporate the products of the demodulating waveform (cosine modulation or sine modulation) and the low-pass filter coefficients, it does not require demodulating multiplication operations and low-pass filtering to be performed separately, as in the prior art, so both the amount of computation and the computational error are reduced, and since the modulating waveform and the low-pass filter coefficients are combined as products in the new filter coefficients, the memory space for storing them is greatly reduced as compared with the prior art. At the same time the FIR filter performs interpolation as well, so the circuit can be considerably smaller than in the prior art.

What is claimed is:

1. A sub-band signal analyzing device having a nonrecursive filter that divides a digital input signal from which have been removed any frequency components greater that half of a rate at which the signal will be sampled, into a plurality of channels, amplitude-modulates the digital input signal in each channel by means of a respective cosine modulating signal and a respective sine modulating signal, these having frequencies equal to the center frequency of the channel, performs low-pass filtering of the amplitude-modulated components in each channel and decimates these components according to the bandwidth of the channel to extract the cosine and sine components in the channel, wherein the center frequency, the decimated sampling rate and the bandwidth of each channel are selected so that the decimated sampling rate is at least as great as the bandwidth and the sampling period after decimation is an integer multiple of the period of the modulating signals, said nonrecursive filter comprising:

an input memory having at minimum a capacity adequate for the number of taps M of the nonrecursive filter, for storing the digital input signal;

a filter coefficient memory for storing two sets of precalculated new filter coefficients, one set consisting of the products $h_m\cos\{2\pi(m/D)J\}$ of a filter coefficient $h_m$ for low-pass filtering corresponding to the m-th tap, where m varies from 0 to M−1, and a cosine signal $\cos\{2\pi(m/D)J\}$, where J is a nonnegative constant that is preset for each channel, and D is the decimation factor $D=(f_S/f_k)J$, with $f_S$ being the sampling frequency used in low-pass filtering in the nonrecursive filter and $f_k$ the center frequency of the channel, and the other set consisting of the products $h_m\sin\{2\pi(m/D)J\}$ of the filter coefficient $h_m$ and the sine signal $\sin\{2\pi(m/D)J\}$, the number of these new filter coefficients being the number required by the number of taps M and the number of channels; and a multiplier-accumulator circuit for performing multiply-accumulate operations to extract the cosine and sine components in each channel at the decimated sampling rate, using the digital input signals stored in the input memory and the new filter coefficients stored in the filter coefficient memory.

2. A sub-band signal synthesizing device for receiving from a sub-band signal analyzing device cosine component data and sine component data for each of a number of channels at a decimated sampling rate, interpolating the cosine component data and sine component data, and performing low-pass filtering and demodulation on the cosine component data and on the sine component data to reconstruct the full-band signal, wherein:

the data received are generated by sampling a signal at a given sampling rate, performing amplitude modulation on the input signal in each channel by means of a cosine wave and a sine wave having a frequency equal to the center frequency of that channel, filtering the resulting modulated components by a low-pass filter, and decimating the signals in each channel by a factor depending on the bandwidth of the channel, such that the decimated sampling period is an integer multiple of the period of the modulating signal; the interpolation, low-pass filtering, and demodulation being performed by a nonrecursive filter, wherein the nonrecursive filter comprises:

an input memory for storing at least as much cosine and sine component data received from the analyzing device at the decimated sampling rate as required for the low-pass filtering computation;

a coefficient memory in which are prestored a set of first filter coefficients, these being the products of the filter coefficients necessary for low-pass filtering multiplied by the demodulating cosine wave, and a set of second filter coefficients, these being the products of the above filter coefficients necessary for low-pass filtering and the demodulating sine wave, with the number of such coefficients depending on the number of taps of the nonrecursive filter and being adequate for the calculation of the data at each sample point after interpolation;

a multiplier-accumulator circuit for multiplying the cosine component data by the first set of filter coefficients and the sine component data by the second set of filter coefficients, and accumulating the results for all channels to generate the synthesized output at an arbitrary sample point; and a control section for calculating the synthesized outputs at each sample point after interpolation in succession, using the data stored in the input memory, the first and second sets of filter coefficients stored in the coefficient memory, and the multiplier-accumulator circuit described above.

3. A signal processing system comprising a sub-band signal analyzing device and a sub-band signal synthesizing device;

the sub-band signal analyzing device comprising:

a first low-pass filter that receives an input analog speech signal and removes from it frequency components greater than half the rate at which the signal will be sampled;

an A/D converter that samples the analog signal output from the first low-pass filter at this sampling rate and converts it to a digital signal; and a first nonrecursive filter that amplitude-modulates the input signal in each of a plurality of channels by means of a cosine modulating signal and a sine modulating signal, these having frequencies equal to the center frequency of the channel, then performs low-pass filtering of the amplitude-modulated components in each channel and decimates these components according to the bandwidth of the channel to extract the cosine and sine components in each channel;

wherein the center frequency, the decimated sampling rate and the bandwidth of each channel are selected so that the decimated sampling rate is at least as great as the bandwidth and the sampling period after decimation is an integer multiple of the period of the modulating signals, wherein the first nonrecursive filter comprises:

a first input memory having at minimum a capacity adequate for the number of taps M of the first nonrecursive filter, for storing the digital signals input from the A/D converter;

a filter coefficient memory for storing two sets of precalculated new filter coefficients, one set consisting of the products $h_m \cos\{2\pi(m/D)J\}$ of a filter coefficient $h_m$ for low-pass filtering corresponding to the m-th tap, where m varies from 0 to $M-1$, and a cosine signal $\cos\{2\pi(m/D)J\}$, where J is a positive integer constant that is preset for each channel, and D is the decimation factor $D = (f_S/f_k)J$, with $f_S$ being the sampling frequency used in low-pass filtering in the first nonrecursive filter and $f_k$ the center frequency of the channel and the other set consisting of the products $h_m \sin\{2\pi(m/D)J\}$ of the filter coefficient $h_m$ and the sine signal $\sin\{2\pi(m/D)J\}$, the number of these new filter coefficients being the number required by the number of taps M and the number of channels; and a first multiplier-accumulator circuit for performing multiply-add operations to extract the cosine and sine components in each channel at the decimated sampling rate, using the digital input signals stored in the first input memory and the new filter coefficients stored in the filter coefficient memory;

the sub-band signal synthesizing device serving for receiving from the sub-band signal analyzing device the cosine component data and sine component data for each of the plurality of channels at the decimated sampling rate, interpolating the data, and performing low-pass filtering and demodulation to reconstruct the original signal, wherein the interpolation, low-pass filtering, and demodulation are performed by a second nonrecursive filter, said second nonrecursive filter comprising:

a second input memory for storing at least as much cosine and sine component data received from the analyzing device at the decimated sampling rate as required for the low-pass filtering computation;

a coefficient memory in which are prestored a set of first filter coefficients, these being the products of the filter coefficients necessary for low-pass filtering multiplied by the demodulating cosine wave, and a set of second filter coefficients, these being the products of the above filter coefficients necessary for low-pass filtering and the demodulating sine wave, with the number of such coefficients depending on the number of taps of the second nonrecursive filter and being adequate for the calculation of the data at each sample point after interpolation;

a second multiplier-accumulator circuit for multiplying the cosine component data by the first set of filter coefficients and the sine component data by the second set of filter coefficients, and accumulating the results for all channels to generate the synthesized output at an arbitrary sample point; and a control section for calculating the synthesized outputs at each sample point after interpolation in succession, using the data stored in the second input memory, the first and second sets of filter coefficients stored in the coefficient memory, and the second multiplier-accumulator circuit.

4. An analyzing device as in claim 1, further comprising:

a low-pass filter that receives an analog input signal and removes from it frequency components greater than half the rate at which the digital input signal will be sampled; and an A/D converter, coupled to an input of said nonrecursive filter, that samples the analog signal output from the low-pass filter at this sampling rate and converts it to the digital input signal.

5. An analyzing device as in claim 1, further comprising:

a low-pass filter that receives an analog input speech signal and removes from it frequency components greater than half the rate at which the digital signal will be sampled; and an A/D converter, coupled to an input of said nonrecursive filter, that samples the low-pass filtered analog speech signal output from the low-pass filter at this sampling rate and converts it to the digital input signal.

6. A nonrecursive filter that upon receiving a digital input signal from which have been removed any frequency components greater than half a rate at which the signal will be sampled, amplitude-modulates the input signal in a channel by means of a cosine modulating signal and a sine modulating signal, these modulating signals having frequencies equal to the center frequency of the channel, performs low-pass filtering of the amplitude-modulated components in the channel and decimates these components according to the bandwidth of the channel to extract the cosine and sine components in the channel, wherein the center frequency, the decimated sampling rate and the bandwidth of the channel are selected so that the decimated sampling rate is at least as great as the bandwidth and the sampling period after decimation is an integer multiple of the period of the modulating signals, the nonrecursive filter comprising:

an input memory having at minimum a capacity adequate for the number of taps M of the nonrecursive filter, for storing the digital input signals;

a filter coefficient memory for storing two sets of precalculated new filer coefficients, one set consisting of the products $h_m \cos\{2\pi(m/D)J\}$ of a filter coefficient $h_m$ for low-pass filtering corresponding to the m-th tap, where m varies from 0 to M−1, and a cosine signal $\cos\{2\pi(m/D)J\}$, where J is a nonnegative constant that is preset for each channel, and D is the decimation factor $D=(f_S/f_k)J$, with $f_S$ being the sampling frequency used in low-pass filtering in the nonrecursive filter and $f_k$ the center frequency of the channel, and the other set consisting of the products $h_m \sin\{2\pi(m/D)J\}$ of the filter coefficient $h_m$ and the sine signal $\sin\{2\pi(m/D)J\}$, the number of these new filter coefficients being the number required by the number of taps M; and a multiplier-accumulator circuit for performing multiply-accumulate operations to extract the cosine and sine components in the channel at the decimated sampling rate, using the digital input signals stored in the input memory and the new filter coefficients stored in the filter coefficient memory.

7. A sub-band signal synthesizing device for receiving from a sub-band signal analyzing device cosine component data and sine component data for a frequency channel at a decimated sampling rate, interpolating the cosine component data and sine component data, and performing low-pass filtering and demodulation on the cosine component data and on the sine component data to reconstruct the signal, wherein:

the data received are generated by sampling a signal at a given sampling rate, performing amplitude modulation on the signal by means of a cosine wave and a sine wave having a frequency equal to the center frequency of the channel, filtering the resulting modulated components by a low-pass filter, and decimating the signal in the channel by a factor depending on the bandwidth of the channel, such that the decimated sampling period is an integer multiple of the period of the modulating signal; the interpolation, low-pass filtering, and demodulation being performed by a nonrecursive filter, wherein the nonrecursive filter comprises:

an input memory for storing at least as much cosine and sine component data received from the analyzing device at the decimated sampling rate as required for the low-pass filtering computation;

a coefficient memory in which are prestored a set of first filter coefficients, these being the products of the filter coefficients necessary for low-pass filtering multiplied by the demodulating cosine wave, and a set of second filter coefficients, these being the products of the above filter coefficients necessary for low-pass filtering and the demodulating sine wave, with the number of such coefficients depending on the number of taps of the nonrecursive filter and being adequate for the calculation of the data at each sample point after interpolation;

a multiplier-accumulator circuit for multiplying the cosine component data by the first set of filter coefficients and the sine component data by the second set of filter coefficients, and accumulating the results to generate the synthesized output at an arbitrary sample point; and a control section for calculating the synthesized outputs at each sample point after interpolation in succession, using the data stored in the input memory, the first and second sets of filter coefficients stored in the coefficient memory, and the multiplier-accumulator circuit.

* * * * *